April 8, 1952  S. B. WILLIAMS  2,592,223
STRAIN RESPONSIVE GAUGE
Filed April 19, 1944  2 SHEETS—SHEET 1
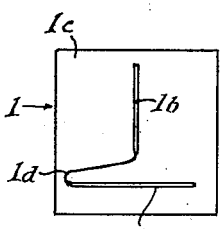
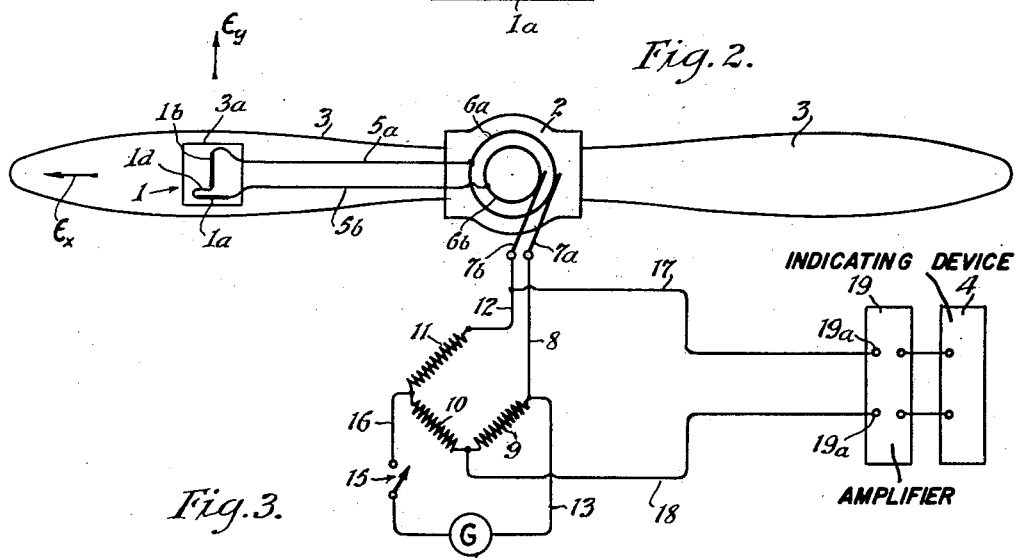
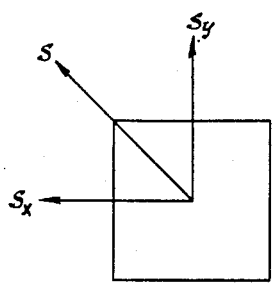
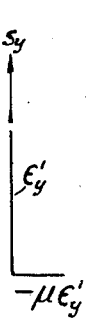
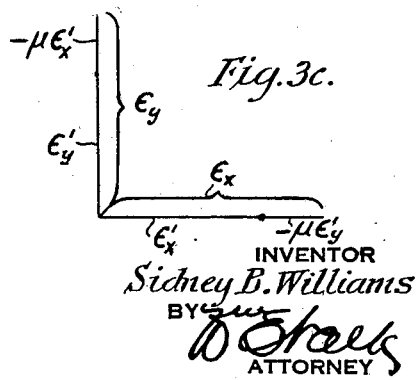
INVENTOR
Sidney B. Williams
BY
ATTORNEY

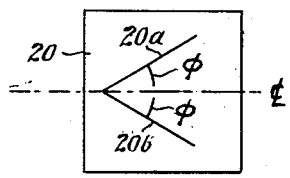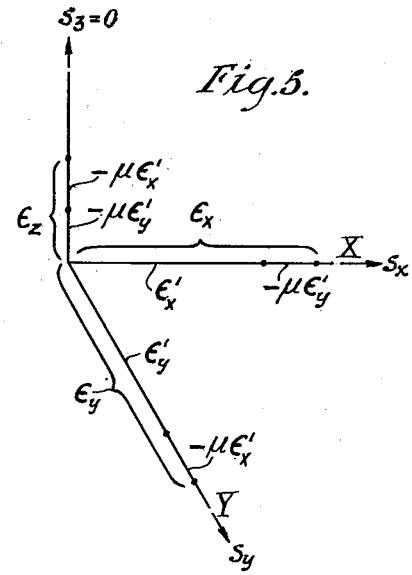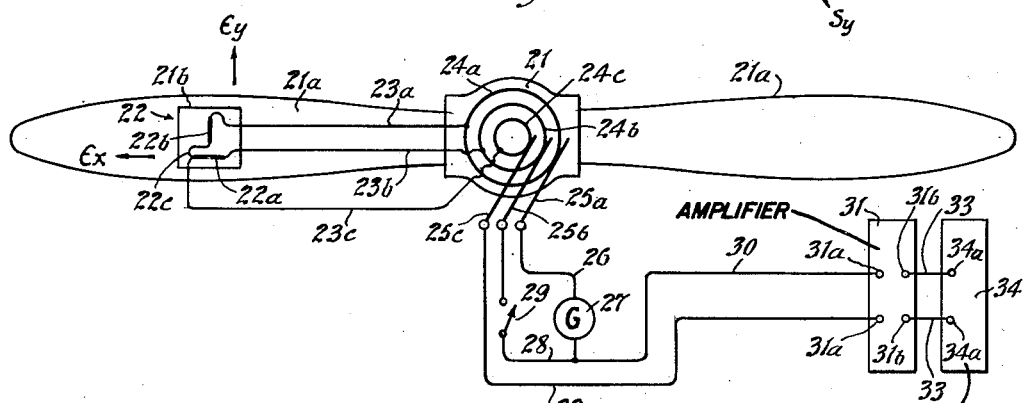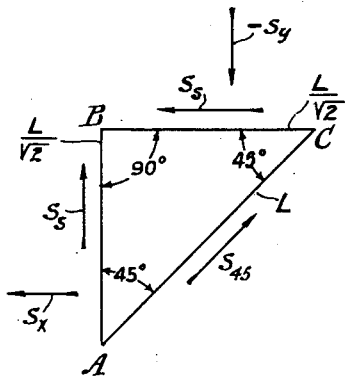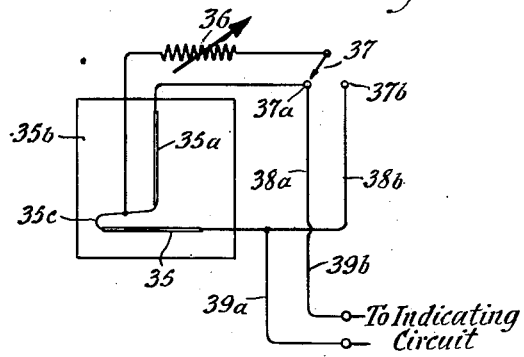
INVENTOR
Sidney B. Williams
BY
ATTORNEY

Patented Apr. 8, 1952

2,592,223

UNITED STATES PATENT OFFICE 2,592,223

STRAIN RESPONSIVE GAUGE

Sidney B. Williams, West Caldwell, N. J., assignor to Curtiss-Wright Corporation, a corporation of Delaware Application April 19, 1944, Serial No. 532,010

17 Claims. (Cl. 73—88.5)

My invention relates to a strain-responsive gage.

My invention further relates to an arrangement sensitive to strains or deformations produced in a test body by the action of stresses.

My invention has further reference to a strain-responsive arrangement sensitive to two mutually perpendicular strain components existing in a body subjected to stresses, this dual sensitivity feature being referred to throughout the specification by use of the word "dyadic."

An object of my invention is to provide means directly responsive to the stress acting in one or more selected directions upon a test body.

A further object of my invention is to provide means directly responsive to changes in thickness caused by the extension or stretching of a sheet, plate or the like.

A further object of my invention is to provide means directly responsive to shearing stress acting in a selected direction upon a test body.

Various other advantages, features and objects of my invention will become apparent by reference to the accompanying drawings, in which:

Figure 1 is a view of a strain-responsive gage constructed in accordance with my invention.

Fig. 2 is a schematic view illustrating the invention.

Figs. 3, 3a, 3b and 3c are graphic illustrations of the principles of my invention.

Fig. 4 is a view of a modified strain-responsive gage.

Fig. 5 is a graphic illustration of a principle of my invention.

Fig. 6 is a schematic view of a modification of the invention.

Fig. 7 is a graphic illustration of a feature of the inventon; and

Fig. 8 is a schematic view of a modification of the invention.

Referring now to the drawings and particularly to Fig. 1, the numeral 1 generally designates a dyadic gage constructed in accordance with a preferred form of my invention, said gage 1 comprising a longitudinally extending strain-responsive resistance wire 1a and a centrally located strain-responsive resistance wire 1b perpendicular thereto. In the first embodiment of my invention, the wire 1b is shorter than the wire 1a and β designates the ratio of the length of the wire 1b to the length of the wire 1a. The wires 1a and 1b are secured to a suitable supporting means 1c, preferably a thin sheet of paper, for example, by cement such as "Glyptal." Extending from the lower end of the wire 1b to the left hand end of the wire 1a is a conductor 1d the resistance of which does not vary in response to strains or deformation thereof which may be done, for example, by making said conductor 1d of large diameter in comparison with the wires 1a and 1b which are of very small diameter, for example $\frac{1}{1000}$ inch, and which have similar electrical and mechanical properties throughout their length.

The above described dyadic gage is adapted to respond to strains on any substantial plane surface. An example of the use thereof is illustrated in Fig. 2 in which an airplane propeller hub 2 carries propeller blades 3, 3 and in which the numeral 3a indicates a surface of one of the propeller blades 3 on which the strains are to be produced. The area 3a is of such small size in comparison with the total blade area as to be of substantially plane configuration, and the hereinafter described strain measurements are made sufficiently close to the surface of said area 3a and over such a short gage length as to approximate point conditions. In accordance with the invention, the dyadic gage 1 and particularly the wires 1a and 1b are suitably secured, for example by cement, to the area 3a. In this manner, the wires 1a and 1b are bonded to the blade area 3a and any strain or deformation of the portion of the area 3a in contact with said wires 1a and 1b will cause a corresponding change in length thereof with resultant proportional change in the resistance of said wires 1a and 1b.

In accordance with the invention, the above noted resistance variations are shown or recorded upon a suitable indicating device 4. To this end, the upper end of the wire 1b is connected by a conductor 5a to a slip ring 6a and the right-hand end of the wire 1a is connected by a conductor 5b to a slip ring 6b. The brushes 7a and 7b are coactable with the slip rings 6a and 6b, respectively. Extending from the brush 7a is a conductor 8 which leads to a Wheatstone bridge, three arms of which are formed by a resistor 9, a resistor 10 and a resistor 11. A conductor 12 extends from resistor 11 to the brush 7b and, as is apparent from the drawing, the series-connected resistance wires 1a and 1b constitute the fourth arm of the Wheatstone bridge. It is to be understood that, if desired, the whole Wheatstone bridge could be mounted upon the propeller. A conductor 13 including a suitable current source 14 extends from a horizontal terminal of the Wheatstone bridge to one terminal of a switch 15, the other terminal of which is connected by a conductor 16 to the other horizontal terminal of the Wheatstone bridge. Branching from conductor 12 is a conductor 17 which extends to an input terminal 19a of an amplifier 19, the other input terminal 19a being connected by a conductor 18 to the lower vertical terminal of the Wheatstone bridge. The output terminals of the amplifier 19 are suitably coupled to the indicating device 4.

The operation is as follows: Upon closure of the switch 15, voltage is supplied to the horizontal opposite terminals of the Wheatstone bridge from the current source 14, while the amplifier 19 is coupled to the vertical opposite terminals of said Wheatstone bridge. The values of the resistors 9, 10 and 11 are suitably chosen, as will be understood by those skilled in the art, so that under initial conditions, that is, with no strain imposed upon the area 3a, the Wheatstone bridge will be in balance and no voltage will be impressed upon the input terminals of the amplifier 19. Upon rotation or vibration of the propeller, stresses act upon the area 3a, causing strain or deformation thereof, this strain being expressible as a longitudinal strain component $\epsilon_x$ and a transverse strain component $\epsilon_y$, these strain components usually being expressed in terms of strain or deformation per unit length together with angular deformation or shearing strains $\gamma_{xy}$, $\gamma_{yx}$ which do not represent any longitudinal or transverse strains of the area 3a in the direction of said strain components $\epsilon_x$ and $\epsilon_y$.

The longitudinal strain component $\epsilon_x$ causes a corresponding change in length $\epsilon_x$ of each unit length of the wire 1a, with a resultant proportional change in the resistance of each unit length of said wire 1a. This change in resistance will be transmitted, through the Wheatstone bridge and amplifier 19, to the indicating device 4, producing an effect thereon proportional to the strain component $\epsilon_x$ and the length of the wire 1a. In similar fashion, the transverse strain component $\epsilon_y$ will produce an effect on the indicating device 4 proportional to said strain component $\epsilon_y$ and the length of the wire 1b.

Due to the different lengths of the wires 1a and 1b, a strain such as $\epsilon_y$ acting transversely of the area 3a produces a lesser effect upon the indicating device 4 than an equal strain acting longitudinally of said area 3a, this decreased effect being due to and in accordance with the ratio $\beta$ of the length of the wire 1b to the length of the wire 1a.

If the length of the wire 1a be selcted as a unit length, the output $V_1$ of the indicating device 4 resulting from the strain component $\epsilon_x$ is proportional thereto and may be expressed as $K\epsilon_x$, where $K$ is a constant of proportionality. Further, the output $V_2$ of the indicating device 4 resulting from the strain component $\epsilon_y$ will be proportional to said strain component $\epsilon_y$ and to the relative length $\beta$ of the wire 1b with respect to the wire 1a, this output $V_2$ being expressible as $K\beta\epsilon_y$, the constant of proportionality $K$ being identical in the two relationships noted above due to the similar electrical and mechanical construction of the wires 1a and 1b. As shown on the drawing, the wires 1a and 1b are connected in series circuit relationship, hence, the total output $V$ of the indicating device 4 resulting from the strains $\epsilon_x$ and $\epsilon_y$ imposed upon the surface 3a, is the sum of the outputs $V_1$ and $V_2$ noted above and may be expressed by the following equation:

$$V = K(\epsilon_x + \beta\epsilon_y)$$

For purpose of description, the wire 1a is designated as the gage axis. It will be understood, therefore, that the dyadic gage is responsive, in a proportionate manner, to strains in the direction of the gage axis and responsive or sensitive in a lesser degree to strains normal to the gage axis. It will be apparent that any desired normal sensitivity may be obtained by selecting a desired length ratio $\beta$ of the wires 1a and 1b or, equivalently, any desired positive value of the constant $\beta$ in the above-noted equation may be selected.

By these novel characteristics, the described dyadic gage is adapted for the direct measurement of stresses acting in the direction of the gage axis. The gage has its axis identified thereon, as by a printed marking or by the shape of the support to enable orientation of the gage on the body in the direction desired for stress measurement. Such identification of the gage axis is desirable on all of the several gage embodiments disclosed and claimed herein. Such utilization may be more clearly understood by reference to Fig. 3 which represents a small, substantially plane area of a stressed body. Those skilled in the art will realize that stresses of the area 3a are expressible as a longitudinal stress component $S_x$ and a transverse stress component $S_y$. As shown, said stress components $S_x$ and $S_y$ both represent tensile stresses, but the invention is not of course to be so limited as either or both of said stress components could be compressive stresses.

Referring to Fig. 3a the stress component $S_x$, acting independently of the stress component $S_y$, produces a proportional longitudinal extension $\epsilon_x'$ of the stressed body, this relationship being expressed by the equation $$S_x = E\epsilon_x'$$

where E is a constant known as Young's modulus. Thus, if the strain $\epsilon_x'$ is measured, the force or stresses $S_x$ in the same direction, being proportional thereto, is readily ascertained. The stress component $S_x$ also produces a lateral contraction $-\mu\epsilon_x'$ in a direction perpendicular thereto, this lateral contraction being proportionally less than the corresponding longitudinal extension $\epsilon_x'$. It will be understood that a positive strain, such as $\epsilon_x'$, denotes an extension of the strained area while a negative strain, such as $-\mu\epsilon_x'$, denotes a contraction of the strained area. In the graphical illustrations of this application, all strains in the same direction, whether tensile or compressive, will be represented by lines drawn in a positive sense upon said graphs. The letter $\mu$ represents Poisson's ratio, or the ratio of transverse to longitudinal strain produced by a longitudinal stress, this ratio having a well-known constant value for each type of stressible material, provided the elastic limit thereof is not exceeded. As shown in Fig. 3b, the stress component $S_y$ produces the transverse strain $\epsilon_y'$ and the longitudinal strain $-\mu\epsilon_y'$.

If the area is sufficiently small, the total longitudinal strain $\epsilon_x$ thereof, as shown by Fig. 3c, is expressible as $\epsilon_x' - \mu\epsilon_y'$ and the total transverse strain $\epsilon_y$ thereof is expressible as $\epsilon_y' - \mu\epsilon_x'$, these relationships being obtained by adding the respective transverse and longitudinal strains caused by the stresses $S_x$ and $S_y$.

As will become apparent from the following description, a dyadic gage of the type described is adapted for the direct measurement of the stress $S_x$ in the direction of the gage axis, this stress $S_x$ being measured in terms of the proportional strain $\epsilon_x'$ of the strained area produced thereby. To this end, the gage is so constructed that the ratio $\beta$ of the length of the wire $1b$ to the length of the wire $1a$ is made equal to Poisson's ratio $\mu$ for the material to be tested. By reference to the hereinbefore described equation it is apparent that the output V of such a gage is $$V = K(\epsilon_x + \mu\epsilon_y)$$

By reference to Fig. 3c and the foregoing description, it will be seen that this equation can be written as follows:

$$V = K(\epsilon_x' - \mu\epsilon_y' + \mu\epsilon_y' - \mu^2\epsilon_x')$$
$$V = K(1-\mu^2)\epsilon_x'$$

It will be noted that the expression $K(1-\mu^2)$ is a constant for each type of material to be tested and that the strain $\epsilon_x'$ is directly proportional to the stress $S_x$.

The output of the gage, as shown by the indicating device 4 is, therefore, proportional to the stress $S_x$ acting in the direction of the gage axis. As will be understood by those skilled in the art, after a suitable initial calibration, the indicating device 4 will record or show the stress in any desired units.

It will be understood that the invention is not to be confined to the particular arrangement of resistance wires heretofore described. Any desired spacing or arrangement of the wires may be used so long as the gage is sensitive both to strains normal to the gage axis and in the direction of the gage axis. For example, I may arrange strain-responsive resistance wires in the shape of a V as illustrated by Fig. 4 in which a supporting sheet 20 has bonded thereto the resistance wires $20a$, $20b$, which are of equal length and symmetrically related with respect to a centerline C, each of the wires $20a$, $20b$ forming an angle $\phi$ therewith. The adjacent ends of the resistance wires $20a$, $20b$ may be connected together as shown, or alternatively, they may be electrically connected by a conductor which is not strain responsive. It will be understood that the free ends of the wires $20a$, $20b$ are to be connected to a suitable indicating device, for example, as shown by Fig. 2. Using this construction, the gage is proportionately responsive to strains acting in the direction of the gage axis or centerline C and responsive to a proportionately less degree to strains normal to said centerline C. The transverse sensitivity $\beta$ of this gage is determined by the angle $\phi$ and the output thereof is expressible by the equation noted above $$V = K(\epsilon_x + \beta\epsilon_y)$$

the transverse sensitivity $\beta$ being expressible in terms of the angle $\phi$ by the equation $$\beta = \tan^2\phi$$

It is apparent that, by setting $\tan^2\phi$ equal to Poisson's ratio $\mu$ for a desired test material, the just described gage will respond, in a proportionate manner, to the stress acting in the direction of the centerline C.

The transverse sensitivity of circular or curved strain-responsive resistance wires may be calculated and said circular or curved sections may themselves be used as stress gages, or they may be used in combination with V-shaped or straight resistance wires to obtain any desired value of transverse sensitivity or any desired gage shape.

For a stress gage, the effective length of the wires normal to the gage axis should bear the ratio $\mu$ to the effective length of the wires in the direction of the gage axis.

Further, the invention is not to be restricted to gages of the resistance wire type. It has been found that a carbon gage is sensitive to strains normal to the axis thereof, this sensitivity being determined by the width to length ratio of the gage. No analytical approach to the problem of correct dimensions for carbon type stress gages has been found, but carbon gages having the following dimensions—determined empirically— have been found suitable for use as stress gages: .110″ x 1″ x .03125″ for use on steel and .130″ x 1″ x .03125″ for use on duraluminum.

I may also employ a rosette or cluster of stress gages consisting of at least three stress gages bonded to a strained area and having their gage axes in different respective directions. From the data shown by such a rosette, the complete stress distribution of the area may be determined by familiar analytical or semi-graphical methods without the necessity of making the complex determinations now necessary to interpret the readings of rosette strain gages into a stress pattern.

Another important aspect of my invention involves the use of a dyadic gage so constructed that the length of the wire $1a$ is equal to the length of the wire $1b$. As will become apparent from the following description, such a gage will measure changes in thickness of a stressed body to which it is bonded, provided that no forces are acting in a direction perpendicular thereto. This construction may most advantageously be used for measuring changes in thickness of a sheet or plate stressed by forces acting in the plane thereof. Such utilization of the dyadic gage may be better understood by reference to Fig. 5 in which the plane XY represents a plate to which a dyadic gage is bonded and $S_x$ and $S_y$ represent the components of stress acting within the plane XY, the vertical stress component $S_z$, being equal to zero as no forces are acting exteriorly of said plane XY. As graphically indicated by the drawing, the stress $S_x$ produces a corresponding extension $\epsilon_x'$ of the plate in the direction of said stress $S_x$ together with a proportionately smaller lateral contraction $-\mu\epsilon_x'$ and vertical contraction $-\mu\epsilon_x'$. In similar fashion the stress $S_y$ produces the extension $\epsilon_y'$ in the direction thereof together with the proportionately smaller lateral contraction $-\mu\epsilon_y'$ and vertical contraction $-\mu\epsilon_y'$. It will be understood that either or both of the stresses $S_x$, $S_y$ could be compressive stresses without departing from the spirit and scope of my invention.

The total change in the thickness of the plate in response to the stresses $S_x$, $S_y$ is $\epsilon_z$ or equivalently $-\mu\epsilon_x' - \mu\epsilon_y'$ which may be written $$-\mu(\epsilon_x' + \epsilon_y')$$

The dyadic gage, in this case, is uniformly responsive to strains in the direction of the gage axis and perpendicular thereto. The output V′ may thus be expressed as follows:

$$V' = K(\epsilon_x + \epsilon_y)$$

and, by reference to the drawing, $$V' = K(\epsilon_x' - \mu\epsilon_y' + \epsilon_y' - \mu\epsilon_x') = K(1-\mu)(\epsilon_x' + \epsilon_y')$$

As previously stated, $\mu$ is a constant for each type of material and the constant K may be given any desired value by well-understood calibration methods. The output of the gage is thus directly proportional to the change in thickness $\epsilon_z$ of the plate, as expressed in the preceding paragraph. Other advantages and uses of the last described embodiment of the dyadic gage will immediately be apparent to those skilled in the art.

By using a dyadic gage of the type just described together with the circuit shown in Fig. 6, the dyadic gage may be utilized to measure the difference between the strain component acting in the direction of the gage axis and the strain component perpendicular to said gage axis, the output $V''$ thereof being, in this case, $$V'' = K(\epsilon_x - \epsilon_y)$$

In the drawing, a propeller hub 21 carries the propeller blades 21a, 21a and 21b represents a small substantially plane area of one of the blades 21a. A dyadic gage 22, of generally similar construction as that last described, is bonded to the area 21b, said gage 22 comprising a longitudinally extending resistance wire 22a and a centrally located resistance wire 22b of equal length and perpendicular thereto, the wire 22a in this case, being the gage axis. A conductor 22c joins the lower end of wire 22b with the left end of wire 22a. The upper end of the wire 22b is connected by a conductor 23a to a slip ring 24a and the right hand end of the wire 22a is connected by a conductor 23b to a slip ring 24b. Branching from the conductor 22c is a conductor 23c which is connected to a slip ring 24c. Brushes 25a, 25b and 25c are coactable with the slip rings 24a, 24b and 24c, respectively. A conductor 26 extends from the brush 25a to one terminal of a suitable current source 27, the other terminal of which is connected by a conductor 28 which includes the switch 29 to the brush 25b. Branching from the conductor 28 is a conductor 30 which extends to an input terminal 31a of an amplifier 31. Extending from the brush 25c is a conductor 32 which extends to the other input terminal 31a of the amplifier 31. The output terminals 31b, 31b are connected by conductors 33, 33 to input terminals 34a, 34a, respectively, of a suitable indicating device 34.

As is apparent from the drawing, upon closure of switch 29, the resistance wires 22a and 22b are connected in series with the current source 27 and the amplifier input terminals 31a, 31a are coupled to the respective opposite terminals of the resistance wire 22a. Any increase in the resistance of the wire 22a due, for example, to a longitudinal tensile strain $\epsilon_x$ of the area 21b, causes an increase in the voltage drop across said resistance wire 22a with resultant increase in input of the amplifier coupled thereto which is reflected by an increase reading on the indicating device 34. Any increase in the resistance of the wire 22b, due for example, to transverse tensile strain $\epsilon_y$ of the area 21b causes an increase in the voltage drop across said wire 22b with resultant decrease in the voltage drop across the wire 22a which, in turn, decreases the input of the amplifier coupled thereto, this decreased input also being reflected by the indicating device 34. Thus, a tensile strain $\epsilon_x$ acting longitudinally of the area 21b causes an increase in the output of the indicating device 34 and a tensile strain $\epsilon_y$ acting transversely of the area 21b causes a decrease in the output of the indicating device 34. As long as the strains are very small in comparison with the total size of the area 21b, which is the case with strains encountered in practical stress analysis work, the described response of the indicating device 34 thereto will be linear and proportional to said strains $\epsilon_x$, $\epsilon_y$, the total output $V''$ of said indicating device 34 being expressible as $$V'' = K(\epsilon_x - \epsilon_y)$$

which, as will become apparent from the following description, is proportional to the shearing stress at an angle of 45 degrees with respect to the gage axis. Referring now to Fig. 7, the triangle ABC represents a small, substantially plane area on which a longitudinal tensional stress $S_x$ and a transverse compressive stress $-S_y$ are acting together with shearing stresses $S_s$, $S_s$ acting in longitudinal and transverse directions, respectively. It will be noted that the angle B is 90 degrees and the angles A and C are each 45 degrees. The letter L denotes the length of the line AC, the lengths of the sides AB and BC each being $$\frac{L}{\sqrt{2}}$$

The line BC corresponds to the gage axis, and it is, therefore, apparent that the line AC is inclined at an angle of 45 degrees thereto. For the system to be in equilibrium, the shearing stress $S_{45}$ along the aforesaid line AC must be equal and opposite to the algebraic sum of the components of the forces $S_x$, $S_y$, $S_s$, $S_s$ acting in the direction of said line AC. As is well understood in the art, each force $S_x$, $S_y$, $S_s$, $S_s$ has an effect upon the triangle ABC expressible as the product of the magnitude of the force and the length of the side of the triangle ABC against which said force is acting. Thus, responsive to the forces $S_x$ and $S_s$, the side AB of the triangle ABC is subjected to a longitudinal extensive stress $$\frac{L}{\sqrt{2}} S_x$$

and an axial shearing stress $$\frac{L}{\sqrt{2}} S_s$$

In similar fashion, the side BC is subjected to a transverse compressive stress $$-\frac{L}{\sqrt{2}} S_y$$

and an axial shearing stress $$\frac{L}{\sqrt{2}} S_s$$

As known in the art, the shearing forces $S_s$, $S_s$ are of equal magnitude and, as shown, are acting on sides of equal length. It is therefore apparent that the components of the shearing stresses $$\frac{L}{\sqrt{2}} S_s, \frac{L}{\sqrt{2}} S_s$$

with respect to the line AC are equal and in opposite directions. Thus, there is no resultant force, in the direction of the line AC from the shearing stresses $$\frac{L}{\sqrt{2}} S_s, \frac{L}{\sqrt{2}} S_s$$

and the magnitude of the shearing stress $S_{45}$ is not affected thereby.

Considering the direction of the shearing stress $S_{45}$ as the positive direction of the line AC, it is apparent that the stress $$\frac{L}{\sqrt{2}}S_x$$

has a component in the direction of the line AC of $$-\frac{L}{2}S_x$$

and the stress $$-\frac{L}{\sqrt{2}}S_y$$

has a component in the direction of the line AC of $$\frac{L}{2}S_y$$

the total stress along the line AC being expressible as $$\frac{L}{2}(S_y - S_x)$$

As stated, the effect $LS_{45}$ of the force $S_{45}$ upon the side AC must be equal and opposite to the total force $S_{45}$ in the direction of the line AC for the system to be in equilibrium. The magnitude of the stress $S_{45}$ thus may be expressed by the following equation:

$$S_{45} = \frac{1}{2}(S_x - S_y)$$

It is known in the art that difference of the forces $(S_x - S_y)$ is directly proportional to the difference of the strains $(\epsilon_x - \epsilon_y)$ produced thereby which, when substituted in the above formula gives:

$$S_{45} = \frac{C}{2}(\epsilon_x - \epsilon_y)$$

where C is a constant of proportionality.

As previously stated, the output V" of the dyadic gage as illustrated by Fig. 6 is:

$$V'' = K(\epsilon_x - \epsilon_y)$$

Thus, the output V" is proportional to the shearing stress $S_{45}$ at an angle of 45 degrees with respect to the gage axis.

It is to be understood that my invention is not to be restricted to an arrangement of two mutually perpendicular resistance wires. Any desired number of wires may be used and these wires may have any desired spacing or angular relation as long as the effective length of the wires normal to the gage axis bears the desired ratio to the effective length of the wires parallel to the gage axis.

It will be further understood that I may employ variable or fixed resistors in shunt with one or more of the strain-responsive resistance wires which comprise the dyadic gage. In this fashion, any desired transverse sensitivity may be obtained by selection of a suitable shunt resistor. In this connection, I may provide switching means to place a resistor in shunt with either a strain-responsive resistance wire in the direction of the gage axis or a strain-responsive resistance wire normal to the gage axis. By utilizing a variable resistor, any desired degree of transverse sensitivity may be obtained and by manipulation of said switching means the stress is measured either in the direction of the gage axis or normal to the gage axis. This embodiment of my invention is illustrated in Fig. 8, in which the dyadic gage comprises a strain-responsive resistance wire 35 defined as the gage axis and a strain-responsive resistance wire 35a of equal length and perpendicular thereto, the wires 35, 35a being bonded to a suitable supporting means 35b, as previously described. A non strain-responsive conductor 35c joins the lower end of wire 35a to the left-hand end of wire 35, a branch of said conductor 35c extending through a resistor 36—which may be either a fixed or variable resistor—to the arm of a double-throw switch 37. The contact members 37a, 37b of switch 37 are connected by conductors 38a, 38b to the upper end of wire 35a and the right-hand end of wire 35b, respectively. Branching from conductors 38a, 38b are conductors 39a, 39b which extend to the respective input terminals of an indicating device through a suitable electrical circuit, for example, as shown by Fig. 2. By manipulation of switch 37, resistor 36 is placed in shunt with either wire 35 or wire 35a. By selection of the value of resistor 36 or by adjustment thereof if a variable resistor is utilized, the resistance of the wire with which said resistor 36 is in shunt may be reduced to $\mu$ times the value of the wire with which said resistor 36 is not in shunt. Thus, the gage is adapted to measure stress either in the direction of the gage axis, or in a direction perpendicular thereto, depending on the position of switch 37. It is obvious that by properly selecting the value of resistor 36, any desired degree of transverse sensitivity may be obtained.

It will be further understood that the dyadic gage as described in the specification is not to be limited to applications involving the measurement of strains on plane surfaces. The dyadic gage may be used on any non-planar surface of such configuration and stress distribution as to be subject to analysis by the theories of plane stress.

Although a propeller blade has been selected as an example for this illustration of my invention, it will be understood that the dyadic gage may be utilized for the measurement of strains in any stressed body.

While the invention has been described with respect to certain particular preferred examples which give satisfactory results, it will be understood by those skilled in the art, after understanding the invention, that various other changes and modifications may be made without departing from the spirit and scope of the invention and it is intended, therefore, in the appended claims to cover all such changes and modifications.

What is claimed as new and desired to be secured by Letters Patent is:

1. A stress gage comprising a strain responsive resistance wire arranged as a V and adapted to be bonded to an article whose stress is to be measured, the angle between the limbs of said V being substantially from 50° to 60°, and the bisector of said angle being identified thereon comprising the axis along which the stress is to be measured said angle being so established that the tangent squared of half of it is a value between .2 and .37.

2. A stress gage comprising a strain responsive resistance wire arranged as a V and adapted to be bonded to an article whose stress is to be measured, the angle between the limbs of said V being substantially from 50° to 60°, and the bisector of said angle being identified thereon comprising the axis along which the stress is to be measured, and connectors for said gage secured to the non-intersecting ends of the limbs of said V said angle being so established that the tangent squared of half of it is a value between .2 and .37.

3. A measuring system for a body subjected to a plurality of stresses along a plurality of axes, comprising a resistance measuring device, and a resistance filament stress gage whose terminals are connected to said device, said gage comprising serially connected strain sensitive limbs angularly related to one another, said gage having identified thereon a major gage axis and a minor gage axis and said limbs having sensitivity to strain parallel to both said axes, said gage having means for securing it to the body and being disposed with its major axis alined with that body axis along which the body stress is to be measured, the gage limbs having projected components of sensitivity along said major and minor axes dimensionally related in accordance with Poisson's ratio for the material of the body whereby change in gage resistance as measured by said device is directly proportional to change in body stress along said major axis as comprised by the relationship of strain in the body along said major and minor axes.

4. A measuring system for a body subjected to a plurality of stresses along a plurality of axes, comprising a resistance measuring device, and a gage having strain responsive resistance wires arranged as a V bonded to the body surface, the angle between the limbs of the V being such that the square of the tangent of half the angle is equal to Poisson's ratio for the material of the body, said limbs being serially connected and said gage being connected at its ends to said resistance measuring device, the bisector of said angle comprising the gage axis along which stress is measured and said gage axis being disposed along the axis on the body along which stress is to be measured.

5. A gage having a gage axis identified thereon comprising serially mounted strain responsive resistance wires adapted to be bonded to the surface of a test body, said wires extending in the direction of said gage axis and laterally thereof and having strain sensitivity along said gage axis and perpendicularly thereto, the sensitivity of said wires in the perpendicular direction being less than the sensitivity of the wires in the direction of the gage axis, the ratio of sensitivity perpendicularly of said axis to the sensitivity longitudinally of said axis having a value between .2 and .37.

6. A gage comprising an insulated supporting means having a major axis identified thereon, a strain responsive resistance wire adhesively secured to said supporting means, the latter being adapted to be bonded to the surface of a test body, said wire having projected components of strain sensitivity both laterally and longitudinally of said axis, the ratio of resistance of said projected components due to lateral and longitudinal strains being equal to Poisson's ratio for the material of the test body, whereby the total resistance of said resistance wire varies directly in proportion to the strains applied to said body in the direction of the gage axis.

7. In combination, a supporting sheet, a plurality of serially connected strain responsive resistance wires adhesively secured to the sheet whose aggregate resistance is to be measured, said sheet being adhesively securable to the surface of a test body, said sheet having identified thereon an axis for alignment with a direction along the test body along which stress is to be measured, said resistance wire having projected components of sensitivity to strains in the test body in directions both normal to and parallel to said axis, the effective sensitivity of said component in a direction normal to the gage axis having a certain ratio to the effective sensitivity of said component in a direction parallel to the gage axis, said certain ratio being between .2 and .37, a current source, a linear amplifier, means including said current source for impressing electrical energy upon said resistance wire, and means for connecting said amplifier in series with said resistance wire, the amplifier input due to the ratio of gage sensitivities in directions normal to and parallel to said gage axis being a linear function of the stress applied to the test body in the direction of the gage axis.

8. A measuring system for a body subject to a stress along an axis comprising a resistance measuring device and a gage connected thereto having at least one strain responsive resistance wire in a continuous series path with said device, secured to the body and so disposed as to have projected components of resistance sensitivity simultaneously to strains along said axis and strains laterally thereof, the sensitivity components in a direction along said axis having a relationship to the sensitivity components in a direction laterally of said axis which is a function of Poisson's ratio for the material of the body and having a value between .2 and .37.

9. A direct stress measuring system for a body subjected to a plurality of stresses along a plurality of axes, comprising a resistance measuring device, and a gage having strain responsive wires bonded to the body surface, said wires having limbs angularly related and connected in series and connected to said resistance measuring device, said gage having identified thereon a principal axis aligned with the direction along which stress is to be measured and a minor axis normal thereto, said strain responsive wire limbs being disposed on said gage to yield strain sensitivities along both said axes, the strain sensitivity along the normal axis divided by that along the principal axis being pre-established as a value equal to Poisson's ratio for the body material.

10. A resistance wire gage for direct stress measurement of stress in a body comprising a support having a first axis identified thereon, strain sensitive resistance wire segments secured to and overlying an area on the support with said segments in series connected relation, said segments together being disposed to have effective strain sensitivity along the first axis and also to have effective strain sensitivity along a second axis normal to the first, said sensitivities, resulting from the disposition of said segments, being so selected that the ratio of the second axis sensitivity to the first axis sensitivity lies between .1 and .45.

11. A resistance wire gage for direct stress measurement of stress in a body comprising a support having a first axis identified thereon, strain sensitive resistance wire segments secured to and overlying an area on the support with said segments in series connected relation, said segments together being disposed to have effective strain sensitivity along the first axis and also to have effective strain sensitivity along a second axis normal to the first, said sensitivities, resulting from the disposition of said segments, being so selected that the ratio of the second axis sensitivity to the first axis sensitivity lies between .2 and .45.

12. A resistance wire gage for direct stress measurement of stress in a body comprising a support having a first axis identified thereon, strain sensitive resistance wire segments secured to and overlying an area on the support with said segments in series connected relation, said segments together being disposed to have effective strain sensitivity along the first axis and also to have effective strain sensitivity along a second axis normal to the first, said sensitivities, resulting from the disposition of said segments, being so selected that the ratio of the second axis sensitivity to the first axis sensitivity lies between .1 and .37.

13. A resistance wire gage for direct stress measurement of stress in a body comprising a support having a first axis identified thereon, strain sensitive resistance wire segments secured to and overlying an area on the support with said segments in series connected relation, said segments together being disposed to have effective strain sensitivity along the first axis and also to have effective strain sensitivity along a second axis normal to the first, said sensitivities, resulting from the disposition of said segments, being so selected that the ratio of the second axis sensitivity to the first axis sensitivity lies between .2 and .37.

14. In a stress measuring system, a resistance wire gage for direct stress measurement of stress in a body comprising a support having a first axis identified thereon, strain sensitive resistance wire segments secured to and overlying an area on the support with said segments in series connected relation, said segments together being disposed to have effective strain sensitivity along the first axis and also to have effective strain sensitivity along a second axis normal to the first, said sensitivities, resulting from the disposition of said segments, being so selected that the ratio of the second axis sensitivity to the first axis sensitivity lies between .1 and .45, means to bond said gage to the body whose stress is to be measured, and means to measure the total resistance of said serially connected gage segments as the body is stressed, the resistance increase in the gage between unstressed and stressed body states being a direct function of body stress along said first axis.

15. In a stress measuring system, a resistance wire gage for direct stress measurement of stress in a body comprising a support having a first axis identified thereon, strain sensitive resistance wire segments secured to and overlying an area on the support with said segments in series connected relation, said segments together being disposed to have effective strain sensitivity along the first axis and also to have effective strain sensitivity along a second axis normal to the first, means to bond said gage to the body whose stress is to be measured, and means to measure the total resistance of said serially connected segments as the body is under stress, the resistance increase in the gage between unstressed and stressed body states being a direct function of body stress along said first axis, said sensitivities, resulting from the disposition of said segments, being so selected that the ratio of second axis sensitivity to first axis sensitivity substantially equals Poisson's ratio for the material of the body.

16. In a stress measuring system, a resistance wire gage for direct stress measurement of stress in a body comprising a support having a first axis identified thereon, strain sensitive resistance wire segments secured to and overlying an area on the support with said segments in series connected relation, said segments together being disposed to have effective strain sensitivity along the first axis and also to have effective strain sensitivity along a second axis normal to the first, means to bond said gage to the body whose stress is to be measured, and means to measure the total resistance of said serially connected segments as the body is under stress, the resistance increase in the gage between unstressed and stressed body states being a direct function of body stress along said first axis, said sensitivities, resulting from the disposition of said segments, being so selected that the ratio of second axis sensitivity to first axis sensitivity substantially equals Poisson's ratio for the material of the body, said ratio having a value between .2 and .37.

17. A resistance wire gage in combination with and attached to a stressable body for measuring body stress comprising strain sensitive wire segments secured in insulated relation thereto and overlying an area on the body with said segments in series connected relation, said segments together having strain sensitivity along a first axis and having strain sensitivity along a second axis perpendicular to the first, the perpendicular sensitivity being less than the sensitivity along said first axis, said segments being so organized and arranged as to yield zero resistance change in the gage upon imposition of stress on the body aligned with said second axis, and to yield a finite resistance change proportional to that stress in the body aligned with said first axis, upon imposition of stress on the body in any other direction than in alignment with said transverse axis.

SIDNEY B. WILLIAMS.

REFERENCES CITED

The following references are of record in the file of this patent:

UNITED STATES PATENTS

| Number | Name | Date |
| --- | --- | --- |
| 1,565,093 | Harrison et al. | Dec. 8, 1925 |
| 2,183,078 | Kemler | Dec. 12, 1939 |
| 2,252,464 | Kearns et al. | Aug. 12, 1941 |
| 2,316,975 | Ruge | Apr. 20, 1943 |
| 2,318,102 | Ruge | May 4, 1943 |
| 2,322,319 | Ruge | June 22, 1943 |
| 2,327,935 | Simmons, Jr. | Aug. 24, 1943 |
| 2,350,972 | Ruge | June 6, 1944 |
| 2,360,493 | Harman, Jr. | Oct. 17, 1944 |

OTHER REFERENCES

"The Development of Electrical Strain Gages," by A. V. de Forest and H. Leaderman. Technical Notes National Advisory Committee For Aeronautics, Washington, January 1940, pages 26 and 27.

"The Strain Gage as an Aid in Aircraft Structural Design," pages 40 through 43 of Automotive and Aviation Industries, June 1, 1942.